(12) United States Patent
Grunwald et al.

(10) Patent No.: US 11,248,702 B2
(45) Date of Patent: Feb. 15, 2022

(54) PARKING LOCK UNIT AND TRANSMISSION ASSEMBLY THEREFOR

(71) Applicant: GKN Automotive Limited, Birmingham (GB)

(72) Inventors: Artur Grunwald, Nümbrecht (DE); Sascha Miebach, Neunkirchen-Seelscheid (DE)

(73) Assignee: GKN Automotive Ltd., Birmingham (GB)

(*) Notice: Subject to any disclaimer, the term of this patent is extended or adjusted under 35 U.S.C. 154(b) by 0 days.

(21) Appl. No.: 17/044,343

(22) PCT Filed: Apr. 5, 2019

(86) PCT No.: PCT/EP2019/058731
§ 371 (c)(1),
(2) Date: Oct. 1, 2020

(87) PCT Pub. No.: WO2019/197301
PCT Pub. Date: Oct. 17, 2019

(65) Prior Publication Data
US 2021/0048104 A1  Feb. 18, 2021

(30) Foreign Application Priority Data
Apr. 11, 2018  (DE) ............... 10 2018 108 596.6

(51) Int. Cl.
*F16H 63/34*  (2006.01)

(52) U.S. Cl.
CPC ..... *F16H 63/3425* (2013.01); *F16H 63/3466* (2013.01)

(58) Field of Classification Search
CPC ... F16H 63/3425; F16H 63/3466; B60T 1/005
See application file for complete search history.

(56) References Cited

U.S. PATENT DOCUMENTS

| | | | |
|---|---|---|---|
| 1,901,361 A * | 3/1933 | Tracy ............... | B60T 7/122 192/218 |
| 6,588,294 B1 | 7/2003 | Rogg | |

(Continued)

FOREIGN PATENT DOCUMENTS

| | | |
|---|---|---|
| CN | 203717890 U | 7/2014 |
| DE | 102008061201 A1 | 6/2010 |

(Continued)

OTHER PUBLICATIONS

Machine language translation of WO2011020669.*
(Continued)

*Primary Examiner* — Mark A Manley
(74) *Attorney, Agent, or Firm* — Bejin Bieneman PLC (57) ABSTRACT

A parking lock unit for a transmission assembly of a motor vehicle includes a parking ratchet wheel defining a longitudinal axis and a first spring arrangement. A second spring arrangement is arranged radially outwards of the first spring arrangement with respect to a longitudinal axis. A supporting sleeve is arranged coaxially to the parking ratchet wheel and is supported in a circumferential direction by the transmission assembly. The supporting sleeve has at least one opening. At least one locking element is arranged between the first and second spring arrangements and is radially movable in the at least one opening with respect to the longitudinal axis. The locking element is spring loaded by at least one of the first and second spring arrangements. The at least one locking element is movable radially inwards into a locked position and radially outwards into a release position by rotation of an actuating ring about the longitudinal axis.

20 Claims, 6 Drawing Sheets

(56) References Cited

U.S. PATENT DOCUMENTS

2009/0188769 A1* 7/2009 Gresley .................... B60T 7/06
  192/219.5
2014/0060994 A1* 3/2014 Burgardt ............. F16H 63/3466
  192/219.6

FOREIGN PATENT DOCUMENTS

DE  102016201177 A1   7/2017
EP       1889763 A2   2/2008
WO    WO2011020669  *  2/2011

OTHER PUBLICATIONS

International Search Report and Written Opinion for PCT/EP2019/058731 dated Jul. 10, 2019 (12 pages; with English translation).

* cited by examiner

PARKING LOCK UNIT AND TRANSMISSION ASSEMBLY THEREFOR

CROSS-REFERENCE TO RELATED APPLICATIONS

This application is a national stage of, and claims priority to, Patent Cooperation Treaty Application No. PCT/EP2019/058731, filed on Apr. 5, 2019, which application claims priority to German Application No. DE 10 2018 108 596.6, filed on Apr. 11, 2018, which applications are hereby incorporated herein by reference in their entireties.

BACKGROUND

A transmission assembly may include a parking lock unit whose main task is to hold the vehicle securely in a parked condition. In particular, due to the use of electrically actuated parking brakes instead of mechanically actuated parking brakes, the parking lock is increasingly becoming the main safeguard against unintentional movement of the vehicle. The locking effect is usually achieved by a locking element that positively engages in a parking ratchet wheel.

Transmission assemblies are necessary in the drivelines of motor vehicles in order to translate the speed-torque characteristics of the drive unit to the speed-torque requirement at the tire. For this purpose, a high speed of the drive unit is usually reduced to the lower speed of the tires via the transmission assembly and the torque of the drive unit is increased inversely proportional to this. If the drive unit is an internal combustion engine, shiftable gears are provided in the transmission assembly to adapt the speed-torque characteristic to the demand characteristic at the tire. The speed-torque characteristic of electric motors, on the other hand, is similar to the demand characteristic on the tire, so that shiftable gears do not usually need to be provided. Since high-speed electric motors have an advantageous power density and are therefore space-optimized, a transmission assembly is usually provided in electrified drivelines anyway, although it has a fixed transmission ratio.

From U.S. Pat. No. 6,588,294 B1 a parking lock unit is known, which blocks the output shaft when the parking lock is activated by the gear change actuator. For this purpose, the parking lock unit comprises a parking ratchet wheel, which is arranged on a drive shaft in a rotationally fixed manner, and a pawl, which is rotatably mounted in the transmission housing and can be selectively engaged with and disengaged from the parking ratchet wheel. For this purpose, in the inserted state, the pawl is pressed against a spring force into the effective range of the ratchet wheel by an actuator rod, so that a tooth of the pawl engages in a tooth structure of the ratchet wheel and thus blocks the rotation of the ratchet wheel and the drive shaft respectively.

From DE 10 2008 061 201 A1 a mechanical rotation lock is known, which is designed as a parking lock of a motor vehicle. The parking lock comprises a disc-shaped bearing shell in which three locking elements are arranged and guided radially with respect to an axis of rotation and parallel to the disc plane. The locking elements are each by a spring element force loaded radially outwards towards a locking position of the parking lock. In the locking position of the parking lock, the three locking elements engage in corresponding recesses formed on an inner circumference of a gear member. By rotating a shift ring, the locking elements can be moved radially inwards against the spring force of the spring elements towards a release position in which the locking elements are located outside the effective range of the recesses.

From DE 10 2016 201 177 A1 a parking lock device for a vehicle transmission is known, in which a locking device is selectively movable by a linear actuator device parallel to a rotational axis of a parking ratchet wheel from a locking position, in which the locking device blocks a rotational movement of the ratchet wheel, to a release position, in which the locking device releases the ratchet wheel, and vice versa.

From EP 1 889 763 A2 a release mechanism for a parking lock coupling is known.

SUMMARY

The present disclosure relates to a parking lock unit for a transmission assembly of a motor vehicle, in particular for hybrid electric vehicles or electric vehicles, as well as a transmission assembly therefor. The present disclosure provides a parking lock unit which, due to its design, requires a small installation space and has a reduced number of required components. Additionally, the present disclosure provides a respective transmission assembly with the parking lock unit, which enables a safe blocking of the transmission power path and requires a small installation space.

A parking lock unit for a transmission assembly of a motor vehicle comprises a parking ratchet wheel, which is rotationally fixedly connectable to a rotatably mounted shaft of the transmission assembly; a first spring arrangement; a second spring arrangement which is arranged, with respect to a longitudinal axis of the parking ratchet wheel, radially outwardly to the first spring arrangement; and at least one locking element, which is arranged between the first spring arrangement and the second spring arrangement so as to be radially movable with respect to the longitudinal axis and is spring-loaded by at least one of the first spring arrangement and the second spring arrangement; and a supporting sleeve which is arranged coaxially to the parking ratchet wheel and can be supported in a circumferential direction on a component of the transmission assembly, and the supporting sleeve has at least one opening in which the at least one locking element is radially movably arranged; wherein, by rotation of an actuating ring about the longitudinal axis, the at least one locking element is movable radially inwards into a locked position, in which the at least one locking element blocks a rotational movement of the parking ratchet wheel, and is movable radially outwards into a release position, in which the at least one locking element releases the parking ratchet wheel, so that the parking ratchet wheel is freely rotatable.

The rotationally fixed connection between the parking ratchet wheel and a shaft of the transmission assembly can be made, for example, by means of splined or keyed connection. The parking ratchet wheel can also be axially secured on the shaft by a snap ring or by a nut. Evenly distributed over the circumference, the parking ratchet wheel has alternating teeth and gaps. In the locked position, the locking elements are each forced into a gap by the actuating ring. When the parking ratchet wheel rotates, the locking elements come into contact with the corresponding teeth of the parking ratchet wheel and are moved by the teeth in the circumferential direction until the locking elements are also in contact with the opening of the supporting sleeve. The supporting sleeve can be supported against rotation on a stationary component of the transmission assembly, and/or it can be connected to a stationary component in a rotationally fixed manner, or it can be designed integrally therewith. The locking elements are thus clamped between a tooth and the supporting sleeve and block the parking ratchet wheel and thus the entire driveline.

The at least one locking element can be a cylindrical roller member. This leads, for example, to a reduction of the contact pressure if the tooth of the parking ratchet wheel has a concave shape in the area where the ratchet element is clamped. The locking elements are resiliently supported between the two spring arrangements. The direction of movement of the locking elements is limited by the openings of the supporting sleeve to a substantially radial direction with respect to the longitudinal axis of the parking ratchet wheel. The outer stop of movement of the locking element is defined by the respective effective diameter of the inner contour of the actuating ring or by reaching a position where the spring forces of the first and second spring arrangement cancel each other out. The inner contour of the actuating ring can be made non-circular for this purpose, so that the effective diameter is changed by a relative rotation between the actuating ring and the supporting sleeve. By rotating the actuating ring, the locking element can thus be pushed in the direction of the parking ratchet wheel when the effective diameter decreases, and the locking element can be released to the release position when the effective diameter increases.

In an example, the inner contour of the actuating ring is designed as a polygon with several corners, e.g., as a polygon with several rounded corners. Such a shape is known, for example, from shaft-hub connections according to DIN 32711, shape P3G for triangles or P4C for squares, and can be applied analogously to polygons with any number of corners. For a design with two locking elements, the polygon can take the shape, e.g., of an ellipse. The polygon has corners, which all lie on a common outer circle with diameter d1 and are evenly distributed over the circumference, wherein the number of corners amounts at least to the number of locking elements. The polygon also has inner points, which all lie on a common inner circle with the diameter d2, and are arranged circumferentially offset to the corners and are evenly distributed over the circumference, wherein the number of inner points corresponds to that of the corners. The maximum spring travel of the locking elements is therefore defined by the halved difference between the diameter d1 and the diameter d2. The maximum spring travel is selected such that the locking elements can be moved completely out of the effective range of the parking ratchet wheel in the release position on the one side, and on the other side project sufficiently far into the effective range of the parking ratchet wheel in the locked position, wherein the locking elements can advantageously, with at least a part thereof, be permanently arranged inside the opening of the supporting sleeve. Besides the polygonal shape, other shapes are also possible which lead to a change in the effective diameter when the actuating ring is rotated, e.g., non-continuous shapes with diameter steps.

The supporting sleeve can be supported in the circumferential direction about the longitudinal axis of the parking ratchet wheel on a component of the transmission assembly, for example, by means of a screw and/or plug connection to the housing of the transmission assembly. In this case, the parking lock unit can be a completely exchangeable module. In a further example, the supporting sleeve can form part of the transmission assembly housing, e.g., it can be integrated in the housing and thus be supported in the circumferential direction relative to the longitudinal axis of the parking ratchet wheel. The openings of the supporting sleeve are spaced in the circumferential direction at the same angular distance as the corners of the polygon of the actuating ring. The openings can be designed as rectangular apertures and have an axial width at each region which is greater than the length of the locking elements.

The first spring arrangement, with an outer circumferential face, can be rotationally fixedly connected to an inner circumferential face of the supporting sleeve. For this purpose, the first spring arrangement can form an interference fit assembly with the supporting sleeve, for example, wherein the resulting frictional force is transmitted substantially in a region of continuous sleeve segments of the first spring arrangement. It is understood that also gluing or any other joining of the first spring assembly and the supporting sleeve that form a fixed connection are also possible.

In an example, the first spring assembly has two ring elements having circumferentially attached spring arms, and the at least one locking element rests on at least one of the spring arms of each of the two ring elements. The spring arms ensure that the locking element is loaded, wherein the effective direction of the spring force is substantially radially outwards. The locking element thus rests on at least two spring arms—one spring arm of each ring element—whose force application points are, e.g., symmetrically spaced from a center of gravity of the locking element so that a largely radial movement without additional tilting is ensured. In one example, the spring arms can all be orientated in the same circumferential direction, either clockwise or counterclockwise. In this case, the spring arms are spaced circumferentially at the same angular distance as the corners of the polygon of the actuating ring. Alternatively, the spring arms can alternatingly point in opposite circumferential directions so that the ends face each other in pairs. In this case, the imaginary center planes between two ends opposing each other are spaced at the same angular distance as the corners of the polygon of the actuating ring, and the locking elements rest on two spring arms per ring element. In this example, the number of spring arms is twice the number of locking elements. This example has the advantage that, upon deflection, the spring arms form a kind of funnel in which the locking elements are also supported in the circumferential direction. The spring arms can be connected to the continuous sleeve segments, for example. The distance between the ring elements in the longitudinal axis direction of the parking ratchet wheel in the area of the spring arms is selected such that that the parking ratchet wheel can rotate between them.

In an example, the two ring elements may have a positioning element by which the first spring assembly is positioned in the circumferential direction relative to the supporting sleeve so that the spring arms are aligned relative to the at least one opening of the supporting sleeve. In the aligned state, the spring arms and the openings are in a relative position to each other as required by the design. This ensures that the spring force of the spring arms acts on the locking elements substantially in a radial direction, and that jamming due to larger force components in the circumferential direction in the opening of the supporting sleeve is avoided, and that the spring force acting on all locking elements is approximately the same in each switching position. In this example the supporting sleeve has a groove complementary to the positioning element. In order to achieve a uniform force effect on the locking elements, two spring arms of a ring element that are adjacent in the circumferential direction can be symmetrically designed.

Alternatively, it is also conceivable that the first spring arrangement is designed in one piece and the two ring elements are connected to each other by connecting webs in the area of the continuous sleeve segments. With this example, the connecting webs must have a larger inner diameter than the outer diameter of the parking ratchet wheel to avoid a collision of the components.

In another example, the first spring arrangement may include at least one annular spring element, which has a supporting portion and a bearing portion. The at least one annular spring element then rests with the supporting portion in a recess of an outer circumferential face of the supporting sleeve. In addition, the at least one locking element rests on the bearing portion of the at least one annular spring element. In this example, the at least one locking element can have a mounting projection or a mounting groove at the circular faces of the cylindrical member.

In order to resiliently load the locking element, the second spring arrangement can be designed as a sleeve which has spring tabs, wherein the at least one locking element rests on at least one of the spring tabs in the release position. The spring tabs can be punched out of a center of the sleeve so that they are arranged between continuous sleeve segments and each are laterally limited by a ring portion. The spring tabs may all be oriented in the same circumferential direction, either clockwise or counterclockwise. In this case, the spring tabs are spaced in the circumferential direction with the same angular distance as the corners of the polygon of the actuating ring. Alternatively, the spring tabs can alternatingly point in opposite circumferential directions so that ends of the spring tabs face each other in pairs respectively. In this case, the imaginary center planes between two opposing ends are spaced with the same angular distance as the corners of the polygon of the actuating ring, and the locking elements each rest on two spring tabs. The number of spring tabs thus corresponds to twice the number of locking elements. This example has the advantage that the spring tabs form a kind of funnel during deflection, in which the locking elements are also supported in the circumferential direction. For a largely radial application of the spring forces to the locking elements, two circumferentially adjacent spring tabs of the second spring arrangement can be designed symmetrically. It is also conceivable that the second spring arrangement is designed in several parts analogous to the first spring arrangement and that the spring tabs are attached to ring elements.

The second spring arrangement, with an inner circumferential face, can be connected to the outer circumferential face of the supporting sleeve in a rotationally fixed manner. In this example, the actuating ring rotates separately to switch the parking lock unit and has an inner contour that deviates from round. In the locked position, the locking element rests on at least one tab, wherein the at least one tab rests largely on the inner contour of the actuating ring. In the release position, the spring tabs can move radially outwards together with the locking elements until this movement is limited by the inner contour of the actuating ring or until the spring forces of the first and second spring arrangement cancel each other out. The sleeve of the second spring assembly may have a positioning element by which the second spring arrangement is positioned in the circumferential direction relative to the supporting sleeve so that the spring tabs are aligned relative to the at least one opening of the supporting sleeve.

In another example, the second spring arrangement, with an outer circumferential face thereof, can be connected on the inner contour of the actuating ring in a rotationally fixed manner. The actuating ring and the second spring arrangement are thus rotated together to actuate the parking lock unit. In this example, at least one of the inner circumferential face of the second spring arrangement and the inner contour of the actuating ring can deviate from a round shape. In the locked position, the locking element rests on a continuous sleeve segment. In the release position, the spring tabs together with the locking elements can move radially outwards until this movement is limited by the inner contour of the actuating ring or until the spring forces of the first and second spring arrangement cancel each other out. The sleeve of the second spring arrangement may have a positioning element by which the second spring arrangement is positioned in the circumferential direction relative to the actuating ring so that the spring tabs are aligned relative to the corners of the inner contour of the actuating ring. Depending on the selection of the two previously mentioned examples, the outer and/or inner circumference of the second spring arrangement is to be designed as a sliding bearing with the corresponding sliding partner.

To ensure that after the actuating ring has rotated to a release position, the locking elements release the parking ratchet wheel, in an example the first spring arrangement may have a higher spring stiffness in the release position than the second spring arrangement, so that the resulting spring force acts on the locking element radially outwards with respect to the longitudinal axis of the parking ratchet wheel.

The actuating ring can be rotated by an electric motor around the longitudinal axis of the parking ratchet wheel, wherein the axis of rotation of the electric motor is arranged coaxially or offset to the longitudinal axis of the parking ratchet wheel. A stator of the electric motor in both of the aforementioned examples is stationary relative to the housing of the transmission assembly. In the coaxial example, a rotor of the electric motor is firmly connected to the actuating ring. If the electric motor is designed with an axis of rotation offset from the longitudinal axis of the parking ratchet wheel, the rotor includes a toothing which engages in a complementary counter-toothing of the actuating ring in order to move the actuating ring. As an alternative to the two example described above, the actuating ring can also be actuated via a Bowden cable.

If the corners of the polygons, the spring tabs of the second spring arrangement, the openings of the supporting sleeve, and the spring arms of the first spring arrangement are each equally spaced according to the number of locking elements, for example 120° with 3 locking elements, and the spring arms and spring tabs are respectively arranged in pairs opposite each other in the circumferential direction, switching from a first release position to a locked position and further to a second release position can be achieved by rotating the actuating ring in the same circumferential direction. The power electronics of the electric motors can thus be designed for only one direction of rotation and a voltage reversal is not necessary. In order to ensure that the vehicle can continue to be used without risk in the event of a power failure of the electric motors, and to prevent an unintentional release of the locked position, the inner contour is designed such that a stable equilibrium is provided in the locked positions. The locking elements thus remain in the locked position until the actuating ring is mechanically rotated.

A transmission assembly with a parking lock unit according to the disclosure offers the same advantages as described above in connection with the parking lock unit. For example, the parking lock unit can be easily connected to the transmission assembly as a pre-assembled unit. For this purpose, two defined interfaces are provided, namely the shaft connection and the housing connection, with which the two units are functionally and physically connected to each other.

SUMMARY OF THE DRAWINGS

The disclosure is explained below using the drawing figures. Herein it shows

DESCRIPTION

Figure 1:
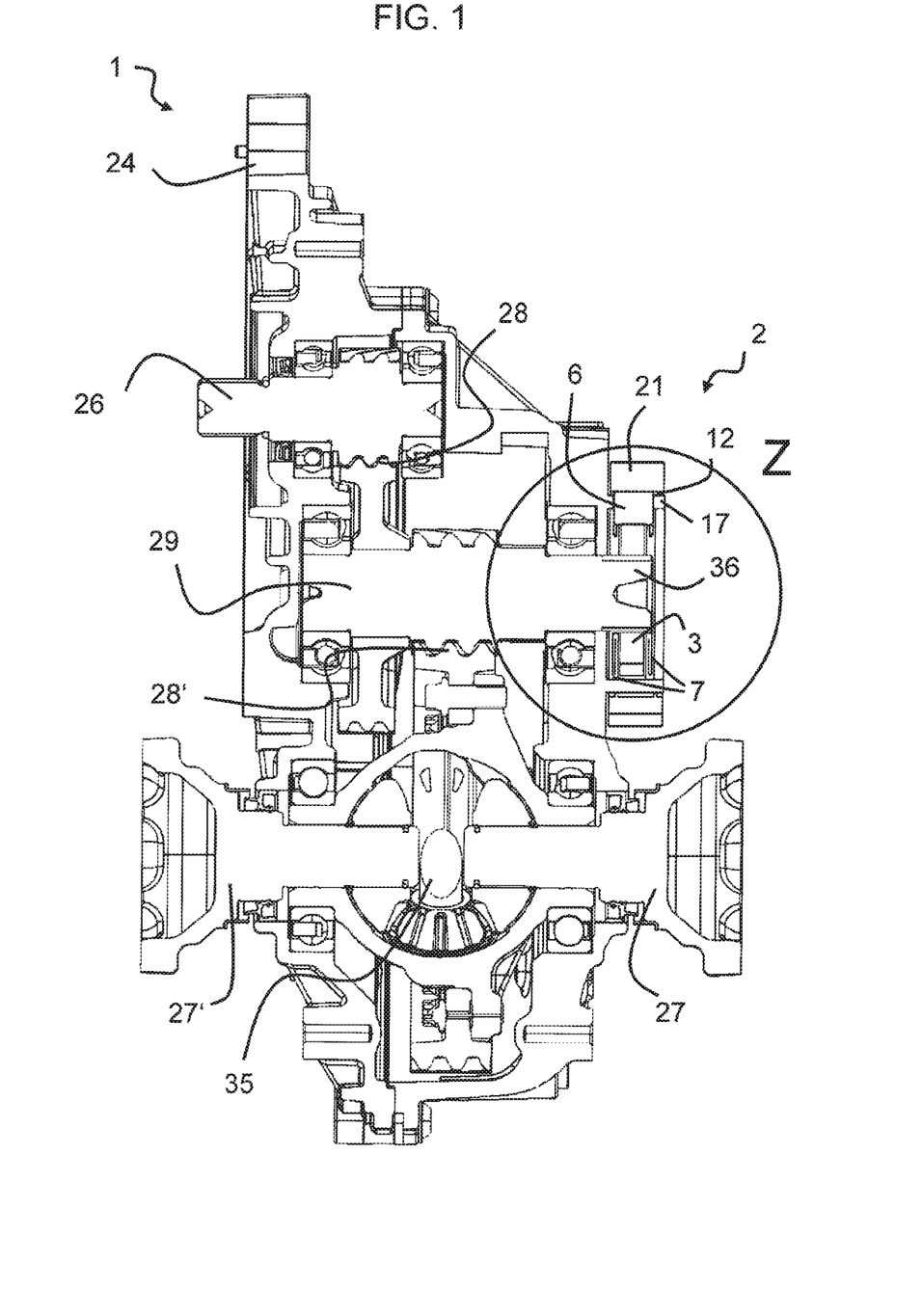
FIG. 1 shows an example transmission assembly with an example parking lock unit in a longitudinal section.

FIG. 1 shows a transmission assembly 1 for an electric and/or hybrid electric vehicle, which comprises two cylindrical gear stages 28, 28' with an associated intermediate shaft 29 and a downstream differential 35. An electric drive motor (not shown) can be connected to a drive shaft 26 via shaft splines and to a housing 24 via a bolt connection, thus creating a complete drive arrangement. The transmission assembly 1 with the drive machine can be used either in purely electric vehicles (BEV) as drive for the front and/or rear axle or in plug-in hybrid vehicles (PHEV) primarily as drive for the rear axle. The drive torque of the drive machine is taken up by the drive shaft 26 and transmitted via the cylindrical gear stages 28, 28'. The differential 35 distributes the transmitted drive torque to output shafts 27; 27', which are rotationally fixedly connected to side shaft gears, and enables the compensation of different speeds at wheels of the respective driven axle, for example, when cornering. A parking lock unit 2 according to the disclosure is arranged on one shaft end 36 of the intermediate shaft 29, which is designed to protect the vehicle from unintentional movement. It is understood that the transmission assembly 1 shown here is only exemplary, and the parking lock unit 2 can also be used in any other transmission assembly and can in particular be arranged within the housing 24.

The structure and locking mechanism of the parking lock unit 2 in a first example is described below with reference to FIGS. 2 to 12. The parking lock unit 2 comprises a parking ratchet wheel 3, which in this case is firmly connected to the shaft end 36 of the intermediate shaft 29. The shaft end 36 has shaft splines 31, onto which the parking ratchet wheel 3 with complementary splines 31' is pushed up to a support shoulder, so that the intermediate shaft 29 and the parking ratchet wheel 3 are connected in a rotationally fixed manner. The parking ratchet wheel 3 is axially fixed on the intermediate shaft 29 by means of a snap ring 30 without being restricted thereto.

Figure 7:
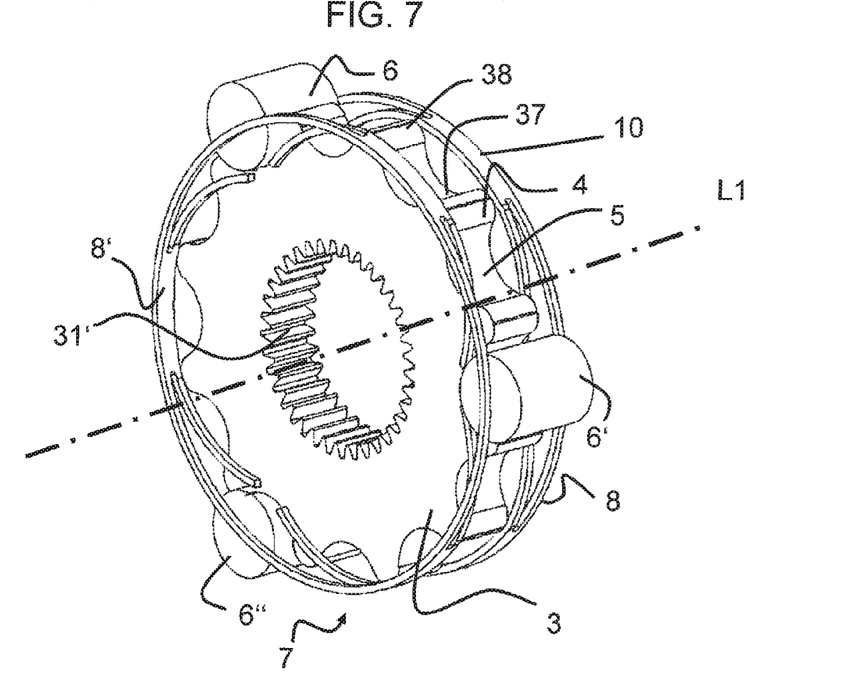
FIG. 7 shows a detailed representation of the contact between the parking ratchet wheel and the locking elements of FIG. 1 in a locked position.
Figure 8:
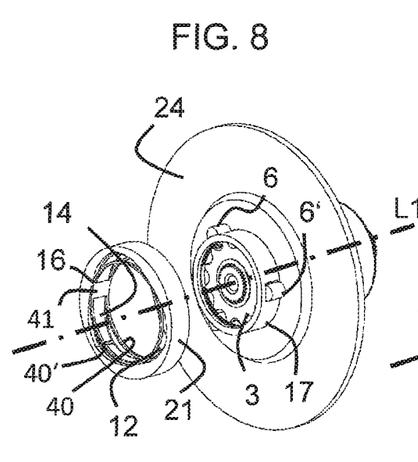
FIG. 8 shows, in a partial exploded view, a detailed representation of the contact between the actuating ring and the second spring element of FIG. 1 in a release position.
Figure 9:
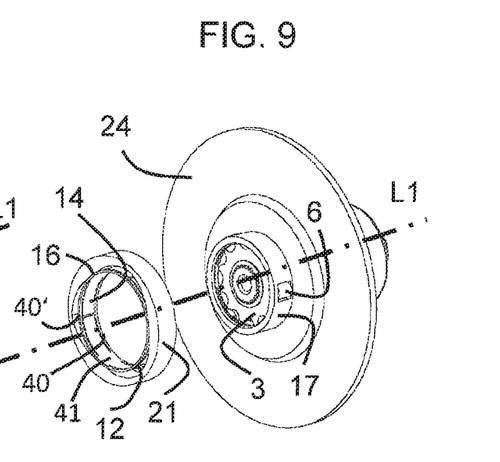
FIG. 9 shows, in a partial exploded view, a detailed view of the contact between the actuating ring and the second spring element from FIG. 1 in a locked position.
Figure 10:
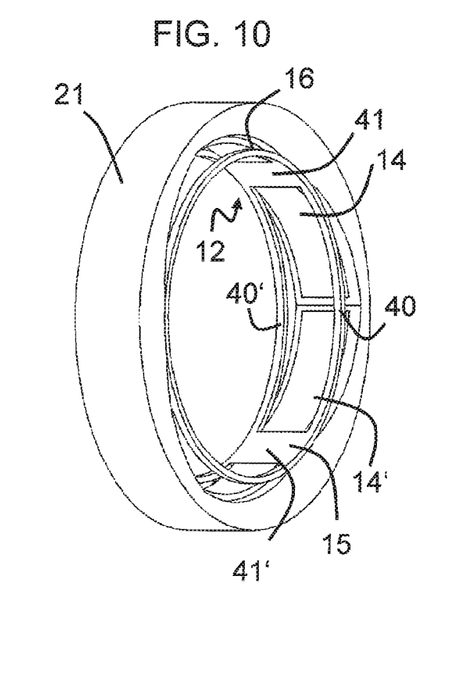
FIG. 10 shows a detailed perspective view of the second spring element of FIG. 1 in a release position of the actuating ring.
Figure 11:
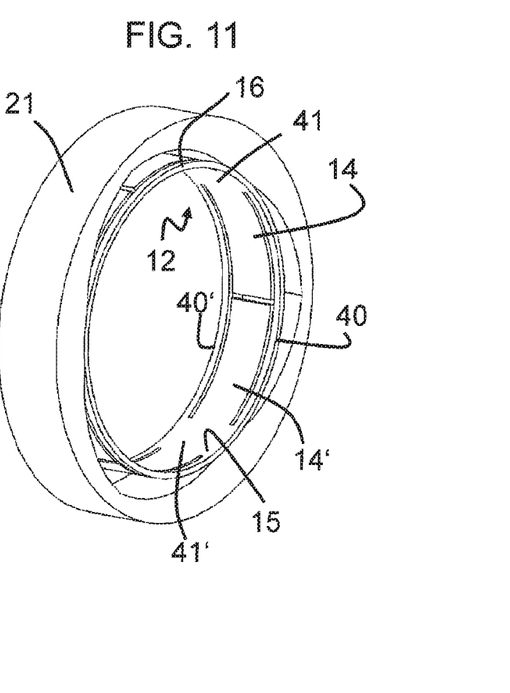
FIG. 11 shows a detailed perspective view of the second spring element of FIG. 1 in a locked position of the actuating ring.

As can be seen in FIG. 7, the parking ratchet wheel 3 has teeth 4 and gaps 5 alternately and evenly distributed around the circumference. The parking lock unit 2 can be switched from a release position to a locked position by moving three locking elements 6, 6', 6" into the gaps 5, thus blocking the rotational freedom of the intermediate shaft 29 about its longitudinal axis via the parking ratchet wheel 3. Any number of locking elements can be selected so that the required locking torque can be transmitted. The teeth 4 have a locking region 37 between a tooth root and a tooth tip, the contour of which is described by a circular segment that has a larger diameter than the locking elements 6, 6', 6" and in which the locking elements 6, 6', 6" rest in the locked position. At the tooth tip, the teeth 4 have a rejecting region 38. This is designed such that, when switching from a release position to the locked position above a critical speed of the intermediate shaft 29, the locking elements 6, 6', 6" are repelled radially outwards, also known as ratcheting, and cannot be moved into the gaps 5. If the speed falls below the critical speed, the locking elements 6, 6', 6" can be moved into the gaps 5 and the driveline is blocked. For this reason, the rejecting region 38 is designed such that a critical speed of the intermediate shaft 29 is reached, which corresponds to a critical vehicle speed below 5 km/h. However, the choice of the critical vehicle speed is significantly influenced by the government regulations and requirements of the vehicle manufacturers. The parking ratchet wheel 3 has to absorb large forces in the locked position, such that a steel material is selected as material for the parking ratchet wheel 3. It is also conceivable, however, that a plastic material optimized for the operational demands is used, e.g., a fiber-reinforced plastic.

Figure 2:
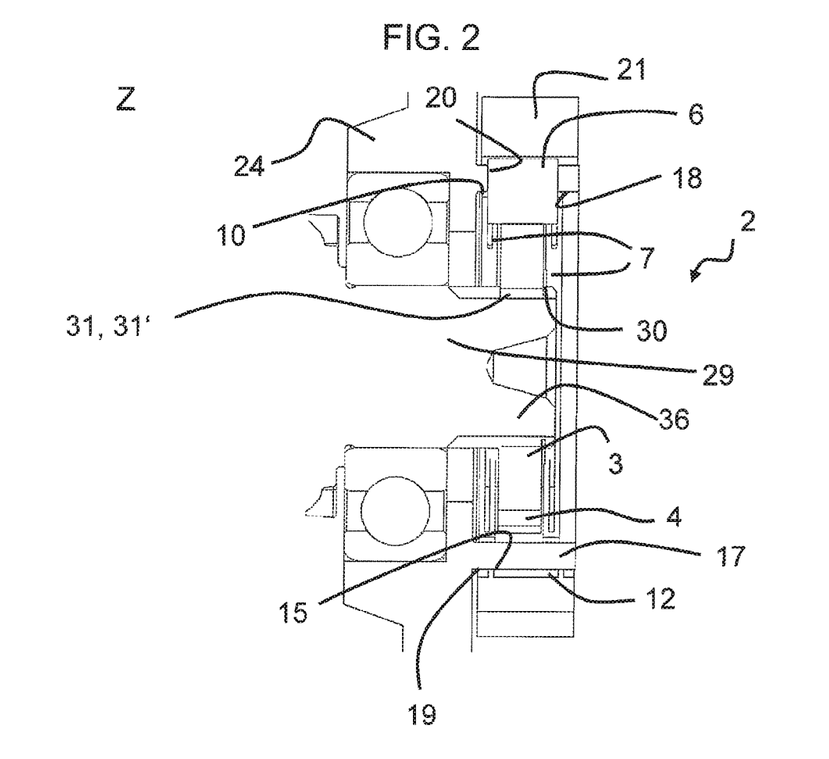
FIG. 2 shows the detail Z of FIG. 1 in enlarged view.
Figure 3:
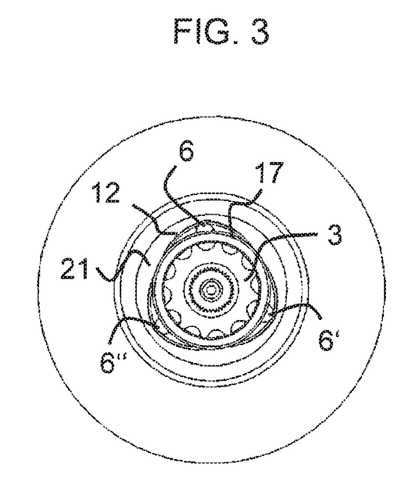
FIG. 3 shows an axial view of the parking lock unit from FIG. 1 in a release position.
Figure 4:
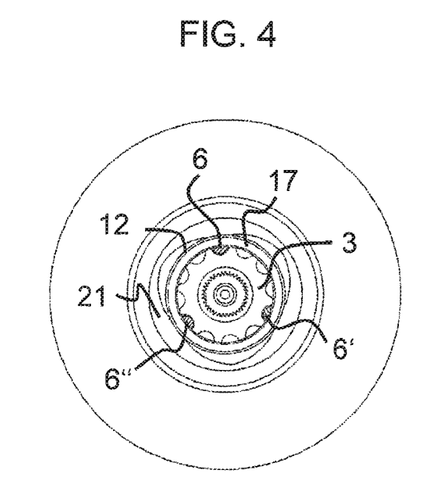
FIG. 4 shows an axial view of the parking lock unit from FIG. 1 in a locked position.

The parking ratchet wheel 3 is enclosed by a supporting sleeve 17, which is, e.g., integrated in the housing 24, which can also be described as the transmission housing, but can alternatively also be attached to the housing 24 by a screw connection. The supporting sleeve 17 is arranged coaxially with the parking ratchet wheel 3. The supporting sleeve 17 has three openings 20 offset by 120° in which the three locking elements 6, 6', 6" are arranged and radially guided. The number of openings 20 thus corresponds advantageously to the number of locking elements 6, 6', 6". The openings 20 are rectangular openings which are only slightly wider than the length of the locking elements 6, 6', 6". In the locked position of the parking lock unit 2, the locking elements 6, 6', 6" are supported by side walls of the openings 20, so that the locking elements 6, 6', 6" are clamped between the supporting sleeve 17 and the parking ratchet wheel 3. To minimize the stress in the contact between the locking elements 6, 6', 6" and the supporting sleeve 17, the side walls of the openings 20 are concave. However, it is also conceivable to make the side walls of the openings 20 straight in order to achieve a further reduction in production costs.

Figure 5:
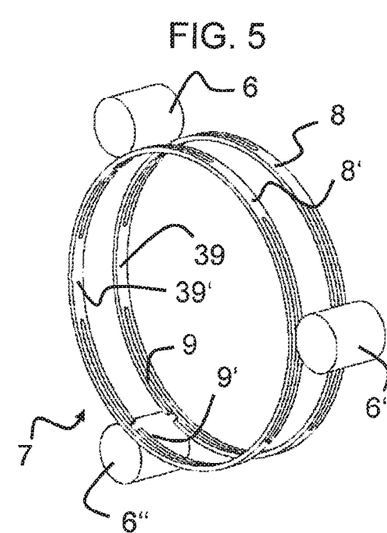
FIG. 5 shows a detailed representation of the contact between the first spring arrangement and the locking elements of FIG. 1 in a release position.
Figure 6:
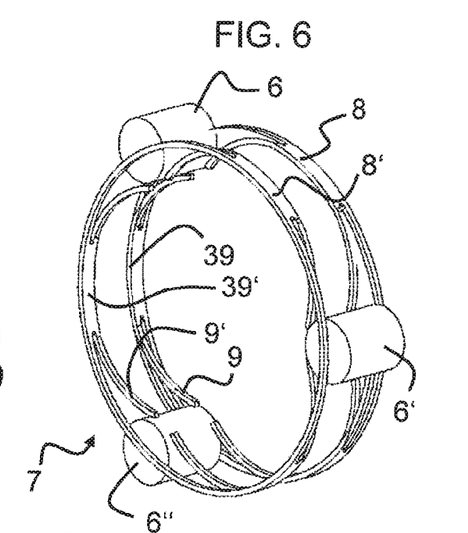
FIG. 6 shows a detailed representation of the contact between the first spring arrangement and the locking elements of FIG. 1 in a locked position.

A first spring arrangement 7, with the outer circumferential face 10, is connected via a press fit at the inner circumferential face 18 of the supporting sleeve 17. The first spring arrangement 7 includes respectively a ring element 8, 8' arranged on a first side of the parking ratchet wheel 3 and on a second side of the parking ratchet wheel 3. The parking ratchet wheel 3 can thus rotate freely between the two ring elements 8, 8'. The ring elements 8, 8' each have three sleeve segments 39, 39' offset by 120°, at whose two opposite ends two spring arms 9, 9' are arranged in the circumferential direction. The three locking elements 6, 6', 6'" each rest on two spring arms 9, 9' and are loaded radially outwards by the spring resilience as long as the spring arms 9, 9' are deflected radially inwards. The first spring arrangement 7 is made of a spring steel, wherein it is also conceivable to use an optimized plastic, e.g., a fiber-reinforced plastic.

A second spring arrangement 12, e.g., made of a metallic material, is arranged radially outside the support sleeve 17. The outer circumferential surface 19 of the supporting sleeve 17 and the inner circumferential surface 15 of the second spring arrangement 12 form a sliding bearing. The second spring arrangement 12 is laterally limited by two circumferential ring portions 40, 40', which are connected to each other by three end-to-end sleeve segments 41, 41'. Two spring tabs 14, 14' extend from the sleeve sections 41, 41' in opposite circumferential directions. The second spring arrangement 12 is pressed, e.g., with an outer circumferential surface 16, into an actuating ring 21, which is arranged and supported coaxially to the parking ratchet wheel 3, and can be rotated together with the parking ratchet wheel 3 relative to the supporting sleeve 17.

Figure 12:
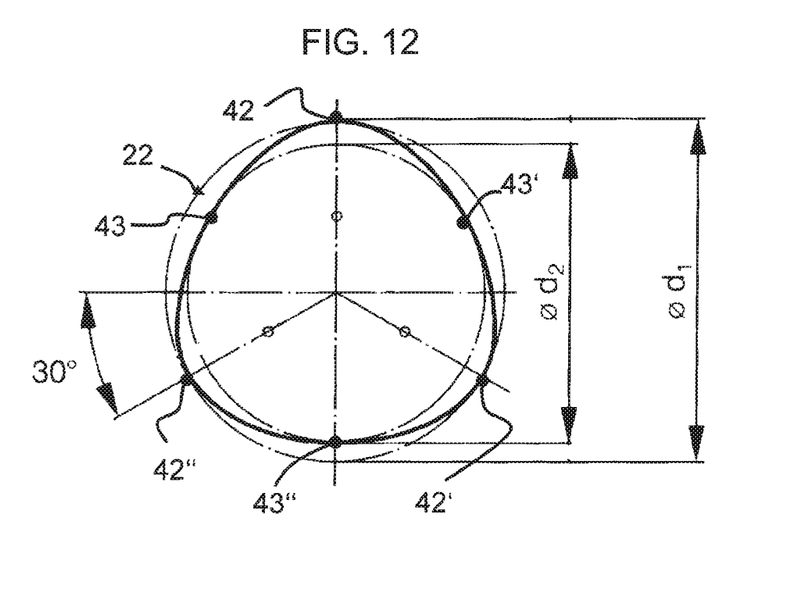
FIG. 12 shows a schematic representation of the inner contour of the actuating ring of FIG. 1.

The inner contour 22 of the actuating ring 21 is designed as a triangular polygon with rounded corners. The corners 42, 42', 42" of the polygon lie on an outer circle with a diameter d1, each offset by 120°. On an inner circle with a diameter d2, three inner points 43, 43', 43" of the polygon are also offset by 120°, so that each corner is followed by an inner point after 60° and vice versa. The corners 42, 42', 42" and the inner points 43, 43', 43" are connected by a continuous contour line, so that the effective diameter of d1 continuously decreases from a corner 42, 42', 42" to an inner point 43, 43', 43". The actuating ring 21 and the second spring arrangement 12 are positioned in the circumferential direction so that the corners 42, 42', 42" lie in the plane spanned by the longitudinal axis L1 of the parking ratchet wheel 3 and the imaginary center between two opposite ends of the spring tabs 14, 14'. The number of sleeve sections 41, 41', the corners 42, 42', 42" and that of the inner points 43, 43', 43" corresponds to the number of locking elements 6, 6', 6" and can be selected so that the required locking torque can be transmitted.

In the release position, a corner 42, 42', 42" is respectively aligned with an opening 20 of the supporting sleeve 17. The locking elements 6, 6', 6" are pressed by the spring arms 9, 9' of the first spring arrangement 7 in the direction of the corners 42, 42', 42" against the spring force of the spring tabs 14, 14' because the spring stiffness of the spring arms 9, 9' is selected to be greater than that of the spring tabs 14, 14'. The locking elements 6, 6', 6" are thus spring-supported between the spring arms 9, 9' and the spring tabs 14, 14' in a radial direction. The locking elements 6, 6', 6" take the position with the greatest possible distance from the longitudinal axis L1 of the parking ratchet wheel 3, such that the parking ratchet wheel 3 is released. The largest possible distance is limited by the contact of the spring tabs 14, 14' on the inner contour 22 of the actuating ring 21. Alternatively, the largest possible distance can also be at the point where the spring forces of the first spring arrangement 7 and the second spring arrangement 12 are in equilibrium.

Turning the actuating ring 21 from the release position towards the locked position reduces the effective diameter of the respective contact point between the spring tabs 14, 14' and the locking elements 6, 6', 6", such that the locking elements 6, 6', 6" are each continuously forced into a gap 5 of the parking locking wheel 3. After 60° rotation angle the locked position is reached.

Figures 13, 14:
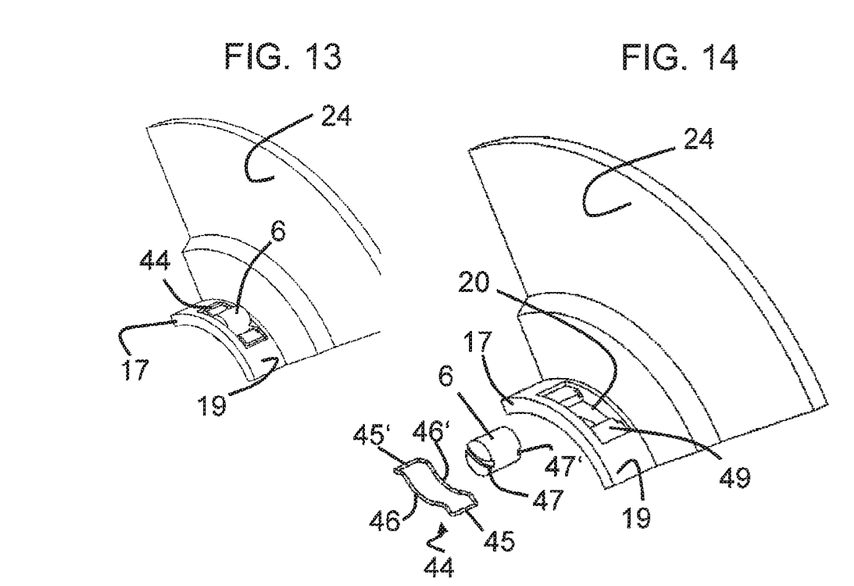
FIG. 13 shows a another example of the first spring arrangement in a perspective partial view.
FIG. 14 shows the first spring arrangement of FIG. 13 in a partial exploded view.

FIGS. 13 and 14, which are described together, show a second example of the first spring arrangement 7. The first spring arrangement 7 comprises three ring-shaped spring elements 44 of which only one is shown. The number of spring elements 44 corresponds to the number of locking elements 6 of the parking lock unit 2. The spring elements 44 have U-shaped supporting portions 45, 45', which are connected to each other via bearing portions 46, 46'. The spring elements 4 are arranged in a recess 49 in the outer circumferential surface 19 of the support sleeve 17 and rest with the supporting portions 45, 45' on the support sleeve 17. The recess 49 embraces the opening 20 of the supporting sleeve 17. The locking elements 6 each have a mounting groove 47, 47' on the circular side of the cylindrical member. The mounting grooves 47, 47' each accommodate a bearing portion 46, 46' of the spring elements 44, such that the spring elements 44 and the locking elements 6 are connected to each other in a form-locking manner. Any movement of the supporting portions 45, 45' of the spring elements 44 in a radial direction relative to the longitudinal axis L1 of the parking ratchet wheel 3 is blocked by the second spring arrangement 12 in the installed state, such that the spring elements 44 are positioned between the supporting sleeve 17 and the second spring arrangement 12. The bearing portions 46, 46' can spring radially inwards or radially outwards together with the locking element 6 in the opening 20.

Figure 15:
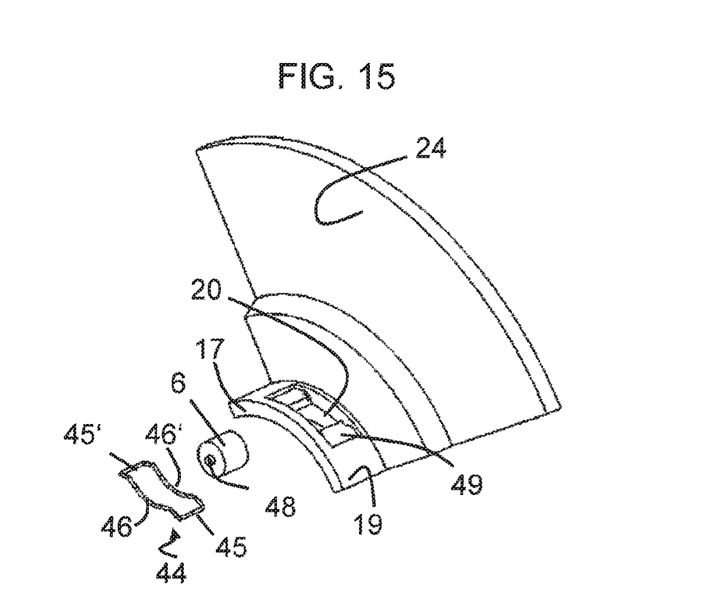
FIG. 15 shows yet another example of the first spring arrangement in a perspective partial view.

FIG. 15 shows the second example of the first spring arrangement 7 in combination with an alternative example of the locking elements 6. The locking elements 6 each have a cylindrical bearing projection 48 on the circular side of the cylindrical body, only one of which can be seen in the perspective of FIG. 13. The bearing projections 48 are located on the bearing portions 46, 46' of the spring elements 44.

Figure 16:
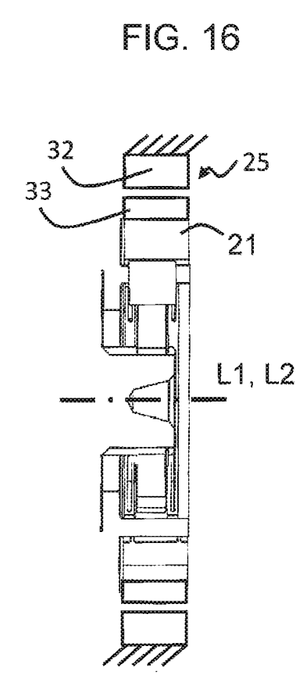
FIG. 16 shows a schematic representation of an electric motor arranged coaxially and rigidly connected to the actuating ring.
Figure 17:
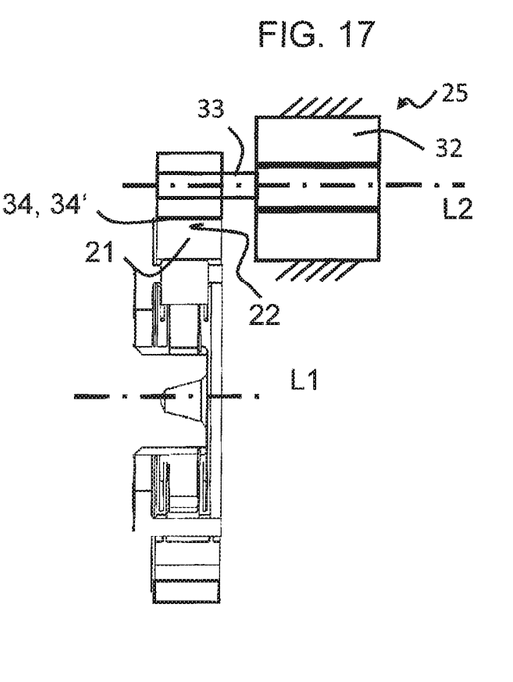
FIG. 17 shows a schematic representation of an axially offset electric motor.

The rotation of the actuating ring 21 is actuated by an electric motor 25. In a first example, shown in FIG. 16, the axis of rotation L2 of the electric motor 25 is coaxial with the longitudinal axis L1 of the parking ratchet wheel 3. A stator 32 is fixed to the housing 24 by a bolted connection. A rotor 33 is firmly connected to the actuating ring 21. In a second example, shown in FIG. 17, the rotation axis L2 of the electric motor 25 is offset axially from the longitudinal axis L1 of the parking ratchet wheel 3. The stator 32 is fixed relative to the housing 24 by a bolted connection. The rotor 33 has a toothing 34 at one end which meshes with a complementary counter-toothing 34' on the outer contour 23 of the actuating ring 21 and thus transmits the rotational movement.

LIST OF REFERENCE SIGNS 1 transmission assembly
2 parking lock unit 3 parking ratchet wheel
4 tooth
5 gap
6, 6', 6" locking element
7 first spring arrangement
8, 8' ring element
9, 9' spring arm
10 outer circumferential surface
12 second spring arrangement
14, 14' spring flap
15 inner circumferential face
16 outer circumferential face
17 supporting sleeve
18 inner circumferential face
19 outer circumferential face
20 opening
21 acutating ring
22 inner contour
23 outer contour
24 housing
25 electric motor
26 drive shaft
27, 27' output shaft
28, 28' gear stage
29 intermediate shaft
30 circlip
31, 31' splines
32 stator
rotor
34, 34' toothing
35 differential
36 shaft end
37 clamping range
38 rejecting portion
39, 39' sleeve segment
40, 40' ring portion
41, 41' sleeve segment
42, 42', 42" corners
43, 43', 43" inner points
44 spring element
45, 45' supporting portion
46, 46' bearing portion
47, 47' mounting groove
49 bearing projection
49 recess
d1 diameter outer circle
d2 diameter inner circle
L1 longitudinal axis parking ratchet wheel
L2 rotary axis electric motor

The invention claimed is:

1. A parking lock unit for a transmission assembly of a motor vehicle, comprising:
a parking ratchet wheel which is connected in a rotationally fixed manner to a rotatably supported shaft defining a longitudinal axis;
a first spring arrangement and a second spring arrangement arranged radially outwardly of the first spring arrangement with respect to the longitudinal axis;
a supporting sleeve arranged coaxially to the parking ratchet wheel and supported against a housing component in a circumferential direction, the supporting sleeve having at least one opening; and
at least one locking element arranged between the first spring arrangement and the second spring arrangement and being arranged radially movable in the at least one opening with respect to the longitudinal axis, the at least one locking element being spring loaded by at least one of the first spring arrangement and the second spring arrangement;
an actuating ring rotatable about the longitudinal axis;
wherein, by rotation of the actuating ring about the longitudinal axis, the at least one locking element is movable radially inwards into a locked position, such that the at least one locking element blocks a rotational movement of the parking ratchet wheel, and radially outwards into a release position, such that the at least one locking element releases the parking ratchet wheel, so that the parking ratchet wheel is freely rotatable.

2. The parking lock unit according to claim 1, wherein the actuating ring has an inner contour having a polygon shape with a plurality of rounded corners.

3. The parking lock unit according to claim 2, wherein the second spring arrangement includes an outer circumferential face connected in a rotationally fixed manner to the inner contour of the actuating ring.

4. The parking lock unit according to claim 3, wherein the second spring arrangement includes spring tabs, the second spring arrangement being positioned in the circumferential direction relative to the actuating ring such that the spring tabs are aligned relative to the corners of the inner contour of the actuating ring.

5. The parking lock unit according to claim 2, wherein the plurality of corners are arranged on a first circle and are evenly distributed over a circumference of the first circle.

6. The parking lock unit according to claim 5, wherein the actuating ring includes a plurality of inner points arranged on a second circle and evenly distributed over the circumference of the second circle, the second circle having a smaller diameter than the first circle, and the inner points being circumferentially offset from the corners.

7. The parking lock unit according to claim 1, wherein the first spring arrangement includes two ring elements with spring arms extending in the circumferential direction, the at least one locking element rests on at least one of the spring arms of each of the two ring elements.

8. The parking lock unit according to claim 1, wherein the first spring arrangement includes an outer circumferential face, the outer circumferential face is connected in a rotationally fixed manner to an inner circumferential face of the supporting sleeve.

9. The parking lock unit according to claim 7, wherein the first spring arrangement is positioned in the circumferential direction relative to the supporting sleeve such that the spring arms are aligned relative to the at least one opening of the supporting sleeve.

10. The parking lock unit according to claim 1,
wherein the first spring arrangement comprises at least one annular spring element having a supporting portion and a bearing portion,
wherein the supporting sleeve includes an outer circumferential face having a recess, the at least one annular spring element rests with the supporting portion in the recess, and
wherein the at least one locking element rests on the bearing portion of the at least one annular spring element.

11. The parking lock unit according to claim 1, wherein the second spring arrangement is a sleeve having spring tabs, the at least one locking element rests on at least one of the spring tabs in the release position.

12. The parking lock unit according to claim 11, wherein the second spring arrangement is positioned in the circumferential direction relative to the supporting sleeve such that the spring tabs are aligned relative to the at least one opening of the supporting sleeve.

13. The parking lock unit according to claim 1, wherein the second spring arrangement includes an inner circumferential face and the supporting sleeve includes an outer circumferential face, the inner circumferential face of the second spring arrangement being connected in a rotationally fixed manner on the outer circumferential face of the supporting sleeve.

14. The parking lock unit according to claim 1, wherein the first spring arrangement has a higher spring stiffness in the release position than the second spring arrangement.

15. The parking lock unit according to claim 1, wherein the supporting sleeve forms part of the housing of the transmission assembly.

16. The parking lock unit according to claim 1, further comprising an electric motor, wherein the actuating ring is rotatable by the electric motor about the longitudinal axis of the parking ratchet wheel, an axis of rotation of the electric motor being coaxial with the longitudinal axis of the parking ratchet wheel.

17. The parking lock unit according to claim 1, further comprising an electric motor, wherein the actuating ring is rotatable by the electric motor about the longitudinal axis of the parking ratchet wheel, an axis of rotation of the electric motor being offset from the longitudinal axis of the parking ratchet wheel.

18. The parking lock unit according to claim 1, wherein the parking ratchet wheel is connectable in a rotationally fixed manner to a shaft rotatably supported by the transmission assembly, the shaft being one of (a) an input shaft, (b) an output shaft, or (c) a drive member arranged in a power path between the input shaft and the outer shaft.

19. The parking lock unit according to claim 1, wherein the parking ratchet wheel includes teeth evenly distributed over a circumference of the parking ratchet wheel and defining gaps therebetween, the at least one locking element extends into one gap in the locked position.

20. The parking lock unit according to claim 19, wherein the at least one locking element is clamped between one tooth and the supporting sleeve in the locked position.

* * * * *